Nov. 23, 1965  R. B. SINGER ETAL  3,219,219
FRAME STRUCTURE AND ENGINE ARRANGEMENT FOR AN INDUSTRIAL TRUCK
Filed Aug. 14, 1963  9 Sheets-Sheet 1

FIG.1

INVENTORS:
ROBERT B. SINGER, CLIFFORD C. BIGLEY,
SAMUEL H. COTTRELL & NOAH ALVIN SHEALY,
BY
Mason, Kolehmainen,
Rathburn & Wyss.
ATTORNEYS

INVENTORS:
ROBERT B. SINGER, CLIFFORD C. BIGLEY,
SAMUEL H. COTTRELL & NOAH ALVIN SHEALY,
BY
ATTORNEYS

FIG. 5

Nov. 23, 1965   R. B. SINGER ETAL   3,219,219
FRAME STRUCTURE AND ENGINE ARRANGEMENT FOR AN INDUSTRIAL TRUCK
Filed Aug. 14, 1963   9 Sheets-Sheet 7

FIG. 8

INVENTORS:
ROBERT B. SINGER, CLIFFORD C. BIGLEY,
SAMUEL H. COTTRELL & NOAH ALVIN SHEALY,
BY
Mason, Kolehmainen,
Rathburn & Wyss.
ATTORNEYS United States Patent Office 3,219,219
Patented Nov. 23, 1965

3,219,219
FRAME STRUCTURE AND ENGINE ARRANGE-
MENT FOR AN INDUSTRIAL TRUCK
Robert B. Singer and Clifford C. Bigley, Minneapolis,
Samuel H. Cottrell, Mound, and Noah Alvin Shealy,
St. Louis Park, Minn., assignors to Minneapolis-Moline,
Inc., Hopkins, Minn., a corporation of Delaware
Filed Aug. 14, 1963, Ser. No. 302,064
10 Claims. (Cl. 214—674)

The present invention relates to industrial vehicles and more particularly to industrial vehicles of the type known as lift trucks.

In lift trucks it is desirable to limit the length and width of the vehicle to dimensions as small as possible in order to facilitate the use of the vehicle in narrow and cramped spaces as are commonly encountered in factories and the like. In addition, while keeping these dimensions as small as possible it is desirable to maintain the center of gravity of the vehicle as low and as far to the rear as possible in order to counterbalance any load being carried or lifted by the vehicle.

In view of these requirements, it is an object of the present invention to provide a new and improved lift truck having relatively small dimensions of width and length and having its center of gravity as low and as far to the rear of the vehicle as possible.

Accordingly, it is another object of the present invention to provide a new and improved vehicle of the type described in the preceding paragraph which has a maximum load lifting and carrying capacity for its relatively small dimensions.

More specifically, it is an object of the present invention to provide a lift truck vehicle of the type described wherein the operator thereof is normally in a standing position at the rearward portion of the vehicle while operating it and the load being carried or lifted is carried at the front end of the vehicle.

Another object of the present invention is the provision of a vehicle of the type described in the preceding paragraph which is powered by an engine being arranged with the crankshaft thereof in parallel relationship with the front drive wheels of the vehicle.

Yet another object of the present invention is the provision of a new and improved vehicle of the type described wherein a fork lift mechanism is pivotally carried on the front axle of the vehicle and new and improved means are provided for controlling the pivotal movement of the mechanism about the axle.

Still another object of the present invention is the provision of a new and improved lift truck of the type described wherein the heat developed by the vehicle engine is removed in a new and improved manner whereby it does not cause discomfort to the vehicle operator.

A still further object of the present invention is the provision of a new and improved lift truck wherein the engine, clutch and transmission assembly, front drive axle and mechanism for controlling the tilt of the fork lift mechanism are arranged in such a manner that they can easily be assembled and disassembled and when assembled form a unitary structure which comprises the front portion of the vehicle.

Another object of the present invention is the provision of a new and improved lift truck of the type described in the preceding paragraph wherein the unitary structure forming the front end of the vehicle can be readily assembled and disassembled from another portion of the vehicle including the rearward portion to provide for easy access to the working mechanisms of the vehicle.

Yet another object of the present invention is the provision of a new and improved lift truck of the type described in the preceding paragraph wherein there is provided a cover member which can be easily assembled or disassembled from the front and rear portion of the vehicle in order to provide easy access from the top of the vehicle.

A still further object of the present invention is the provision of a new and improved lift truck employing an engine arranged with its crankshaft parallel to the drive wheels of the vehicle wherein the engine is provided with a bank of cylinders in line and provision is made for the rapid assembly of another in-line bank of cylinders on a common crankcase assembly of the engine to provide a V-type engine for additional power when desired.

Another object of the present invention is the provision of a new and improved lift truck utilizing an air-cooled engine of the internal combustion type employing overhead valves driven by a cam-shaft which is positioned adjacent the upper-end of the cylinders.

A still further object of the present invention is the provision of a new and improved drive mechanism for a lift truck vehicle which is hydraulically controlled and which comprises a clutch, transmission and differential mechanism in an integral housing with means being provided for easy access to the various components of the drive mechanism.

Yet another object of the present invention is to provide a new and improved engine for a vehicle in which a new and unique cam-shaft drive arrangement is provided to facilitate adjusting of valve clearances.

Another object of the present invention is to provide a new and improved engine for a vehicle wherein the cam-shaft is mounted adjacent the valve ends of the cylinders and is driven by an auxiliary distributor shaft.

Briefly, the foregoing and other objects and advantages of the present invention are accomplished by the provision of a new and improved lift truck vehicle of the type wherein the operator assumes a standing position adjacent the rear of the vehicle. The vehicle is comprised of a forward lift portion, an engine drive portion, a rearward control portion and a removable cover portion. These portions are adapted to be readily assembled to form the completed vehicle and rapidly disassembled from one another to facilitate maintenance and servicing on the central engine drive portion.

The forward lift portion is pivotally secured about the front drive axle and is hydraulically actuated for lifting large loads. The angle of tilt of the lift portion is controlled in a new and unique manner in that a single hydraulic unit having one end connected to the engine drive portion and the other to the lift portion is utilized rather than the conventional two units normally required. This construction is possible because of the unique design of the engine drive portion which allows a centrally placed cylinder to be utilized. Consequently the forward lift portion can be easily and rapidly removed from the engine drive portion with a minimum of manipulation thus exposing the forward end of the engine drive portion for easy maintenance.

The engine drive portion comprises a drive wheel axle including a differential mechanism, a hydraulically operated clutch and transmission system having operating shafts in parallel arrangement with the drive wheel axle and a drive engine having its crankshaft in parallel relation with the drive axle. These components are secured together to form an integral center portion of the vehicle which is compact and has a low center of gravity. On both sides of this portion there are provided bosses having tapped openings into which fastening devices can be inserted to attach the rearward control portion of the vehicle. One feature of the central drive engine portion of the vehicle is the use of an in-line, slant-V-type engine having only one bank of cylinders initially, but having provisions therein for adding another bank if more power is required. Another feature is the provision of the parallel arrangement of the engine crankshaft and drive wheel axle of the vehicle which allows the heat developed by the engine to be disposed of transversely of the vehicle by a crankshaft driven fan and thus eliminates the flow of hot air from the region where the operator is standing.

A unique feature of the engine drive portion is the arrangement of the engine, clutch and transmission system and drive axle in a compact unitary structure which can be readily maintained. The clutch and transmission system is hydraulically operated and the main shaft thereof is orientated in parallel relation between the engine crankshaft and the drive wheel axle and is drivingly connected thereto by spur gearing. This arrangement allows for a compact, easily serviceable, unitary structure to which the front lift portion, rear control portion and removable cover portion can be rapidly connected or disconnected. The rear control portion is provided with a pair of side plates which are secured to bosses provided on the engine drive portion by means of several fasteners. Thus, by removing these fasteners and a few control linkages between the portions, the rear control portion can be separated from the engine drive portion in a short time.

A removable cover portion is provided to enclose the top of the engine drive portion and to provide baffling for the flow of cooling air over the engine. The cover can rapidly be removed by the removal of several fasteners so that maintenance can be performed on the engine drive portion with ease.

The rear control portion includes a control pedestal which carries the vehicle controls and linkages, the driver's platform and counterweight, and the steering mechanism and steerable rear wheels of the vehicle. A fuel tank is positioned adjacent the control pedestal and vehicle control pedals such as throttle and brake are positioned on the platform.

For a better understanding of the invention, reference should be had to the following detailed description taken in conjunction with the drawings, in which.

Referring now to the drawings, there is illustrated an industrial vehicle 20 comprising a forward lift portion 22, an engine drive portion 24, a rear control portion 26 (FIG. 1) and a removable cover portion 28. These portions, making up the complete vehicle, are readily disassembled from one another as is shown generally in FIG. 4 so that each portion can be independently serviced or replaced.

Figure 5:
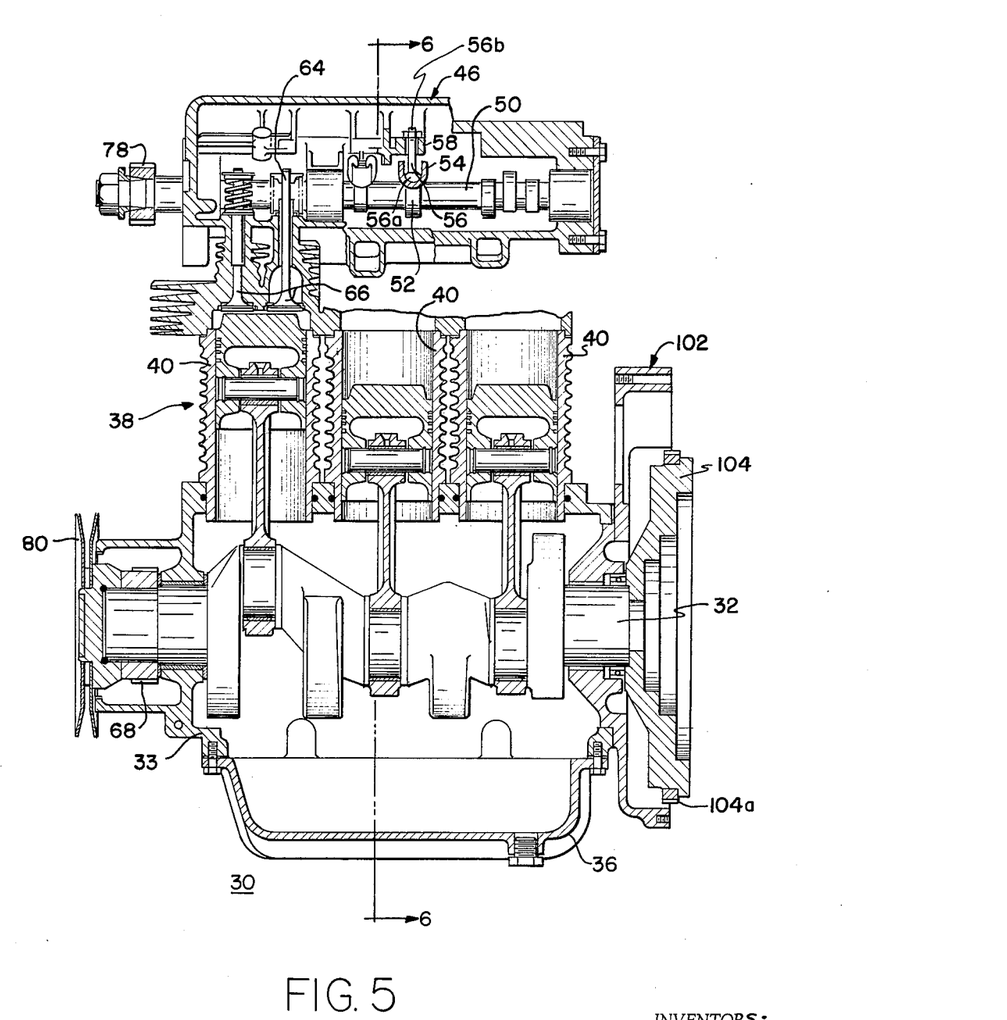
FIG. 5 is a sectional view of an engine used in the vehicle of FIG. 1 taken substantially along line 5—5 of FIG. 6.
Figure 6:
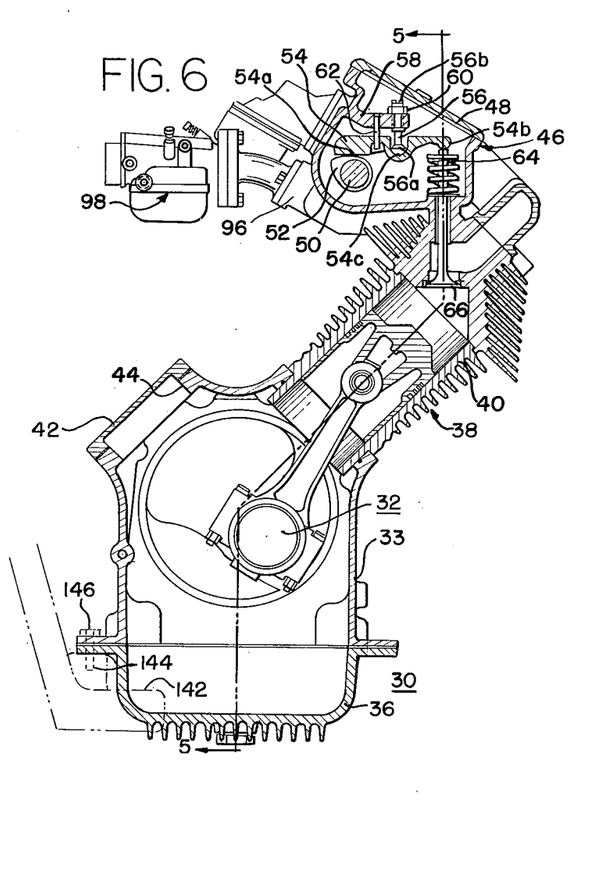
FIG. 6 is a sectional view of the engine of FIG. 5 taken substantially along line 6—6 of FIG. 5.
Figure 7:
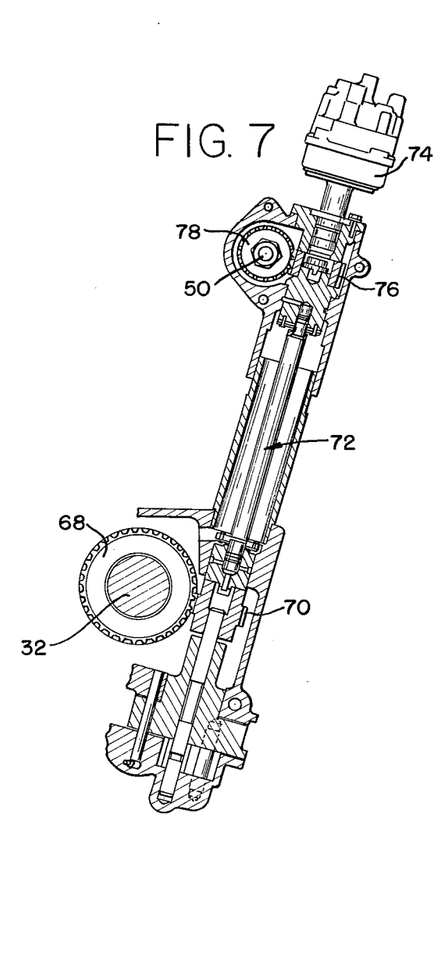
FIG. 7 is a sectional view of a cam shaft and distributor drive mechanism of the engine of FIGS. 5 and 6.

The engine drive portion 24 comprises an internal combustion engine 30 which is arranged relative to the vehicle to have its crankshaft 32 positioned to lie parallel to the rotational axis of the front drive wheels 34 of the vehicle. Referring specifically to FIGS. 5, 6 and 7 of the drawings, the engine 30 is of a slant-V configuration having a crank case 33, oil pan 36 and a bank of cylinders 38. The bank of cylinders 38 includes a plurality of individual cylinders 40 which are arranged in line with each other and with their central axes intersecting the axis of rotation of the crankshaft 32 at approximately a 45° angle from horizontal. The engine 30 as shown in FIGS. 5, 6 and 7 has only a single in-line bank of cylinders 38, however, provision is made at the upper portion of the crank case 33 for the addition of another bank of cylinders should more power be required by removing the covers 42 and inserting additional cylinders in the openings 44.

Adjacent the head end of the cylinders 40, there is provided a cam shaft and rocker cam housing 46 which extends parallel to the crankshaft axis. The housing 46 is provided with a removable cover 48 in order to provide easy access to the mechanism within the housing from the top of the engine. Within the housing there is provided a cam shaft 50 having a plurality of cams 52 which actuate rocker arms 54. The rocker arms 54 are secured by pivot bolts 56 which are threadedly received in supporting fingers 58 provided in the housing 46. Each rocker arm 54 is provided with a cam engaging surface 54a at one end and a valve stem engaging portion 54b at the other end.

Intermediate the ends of the rocker arm 54 it is provided with a spherical recess 54c to accommodate a spherical head 56a of the adjustable pivot bolt 56. The upper end 56b of pivot bolt 56 is provided with a notch so that a screw driver may be used to adjust the bolt relative to the support finger 58 and thereby adjust the valve clearance of the engine. A lock-nut 60 is provided to secure the bolt 56 in its adjusted position and a key pin 62 is provided to prevent lateral pivoting of the rocker arm 54.

It can be seen from FIG. 6 that the rocker arm 54 is directly engaged at one end 54a by the cam 52 and that the other end 54b of the arm directly engages the upper end of the valve stem 64 of the in-head exhaust and intake valve assemblies 66, thus eliminating tappets and push rod mechanisms. Moreover, adjustment of the valve clearance is easily accomplished because of good accessibility at the top of the engine and because the bolt 56 is not moving up and down while adjustment is being made.

The cam shaft 50 is driven by means of a gear 68 on one end of the crankshaft 32. The gear 68 meshes with a gear 70 which is carried on an upwardly extending cam and distributor drive shaft assembly 72. A distributor assembly 74 is carried at the upper end of the shaft assembly 72 and there is also provided an upper cam drive gear 76 which meshes with a cam gear 78 to complete the driving means for the cam shaft 50. Should another bank of cylinders be added to the engine, another cam shaft drive assembly would be necessary to drive the newly added cam shaft.

The end of the engine crank shaft 32 having the gear 68 thereon is provided with a belt pulley 80 drivingly connected by means of a fan belt 84 driving a pulley 86 and fan 82 mounted on the shaft of a generator 88 which along with the battery 90 supplies electrical power for the vehicle when the engine is running. The fan 82 and generator 88 are housed in a cylindrical cage 92 which directs the air flow from the fan in through a grill 94 provided in the side wall of the cover portion 28. Another grill (not shown) is provided in the opposite side of the cover portion 28 to provide an outlet for the heated air from the engine. It should be noted that the cylinders 40 of the engine and their head assemblies are provided with cooling fins and are air cooled rather than water cooled. For this reason a large quantity of cooling air must be passed over the engine and a fan such as that depicted with the surrounding cage 92 is a highly durable type. It should also be noted that the flow of cooling air is crosswise of the vehicle and thus the operator is not uncomfortable because the hot air or gases from the engine are not directed to the rear as is common in other vehicles of this type.

Fuel and air are supplied to the engine in a conventional manner by means of an intake manifold 96, carburator 98, and air cleaner system 100. It should be noted that all of these components are readily accessible for maintenance and servicing when the cover portion 28 is removed from the vehicle.

Power from the engine 30 is taken from the end of the crankshaft 32 opposite the pulley 80. There is provided an enlarged flywheel and starter gear housing 102 which encases a flywheel 104 secured to the end of the crankshaft 32. The perimeter of the flywheel 104 is provided with teeth 104a in order that it can be engaged by a starter gear assembly 106 which is driven by a starter 108.

Figures 10, 11:
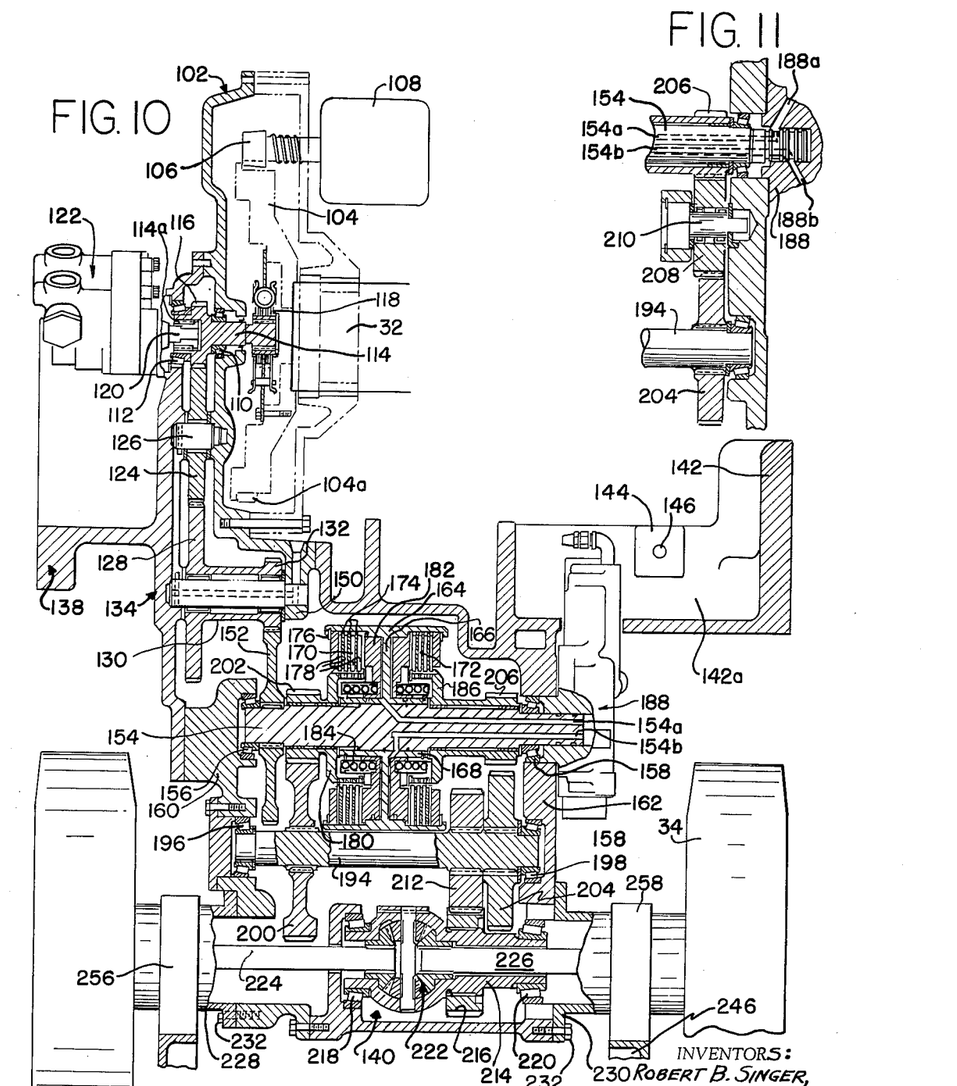
FIG. 10 is a sectional view of the engine drive portion taken substantially along line 10—10 of FIG. 8.
FIG. 11 is a sectional view of the engine drive portion taken substantially along line 11—11 of FIG. 8.

As best seen in FIG. 10, co-axial with the engine crankshaft 32 and journaled in bearings 110 and 112 carried in the housing 102 there is provided a spindle 114 having a pinion 116 integral therewith. The inner end of the spindle 114 is connected to the flywheel 104 by means of a shock coupling assembly 118. The outer end of the spindle 114 is splined as at 114a to receive the splined end of a shaft 120 of a hydraulic pump 122 which is utilized to provide hydraulic fluid under pressure for operation of the clutch and transmission system of the vehicle and the fork lift mechanism.

The pinion 116 meshes with a larger gear 124 carried on a stub axle 126 and the gear 124 in turn meshes with a gear 128 which is integrally formed on a hollow spindle 130. The other end of the hollow spindle 130 is provided with an integrally formed pinion 132 which drives the clutch and transmission system of the vehicle. The pinion 116, gear 124, gear 128 and spindle 130 and pinion 132 form a reduction gear train to drive the clutch and transmission system at a speed reduced from the engine speed since vehicles of this class are generally low speed vehicles. This gear train is enclosed in a housing 134 (FIGS. 1, 9 and 10) which is bolted to the housing 102 and the clutch and transmission system by means of a plurality of bolts 136. The housing 134 is provided with an enlarged L-shaped boss 138 which forms one of a pair of support brackets for interconnecting the engine drive portion 24 with the rear control portion 26.

The vehicle is provided with a clutch, transmission and differential drive system which is housed in an enlarged housing 140. Referring to FIG. 10, it can be seen that the housing 134 forms a portion of a side wall for the housing 140 and is bolted thereto at a plurality of points with the bolts 136. The other side of the housing 140 is provided with an integrally formed L-shaped boss 142 (FIGS. 4, 8 and 10) which is similar to the boss 138 and is utilized as a support bracket for interconnecting the engine drive portion 24 with the rear control portion 26. The engine 30 is secured to a boss 144 formed on an integral extension 142a of the housing 140 by bolt 146 (FIGS. 4, 6, 8 and 10) so that the engine and clutch, transmission and drive assembly are formed into an integral unit (FIG. 4) which is easily assembled to the rear control portion 26 and forward lift portion 22.

Figure 8:
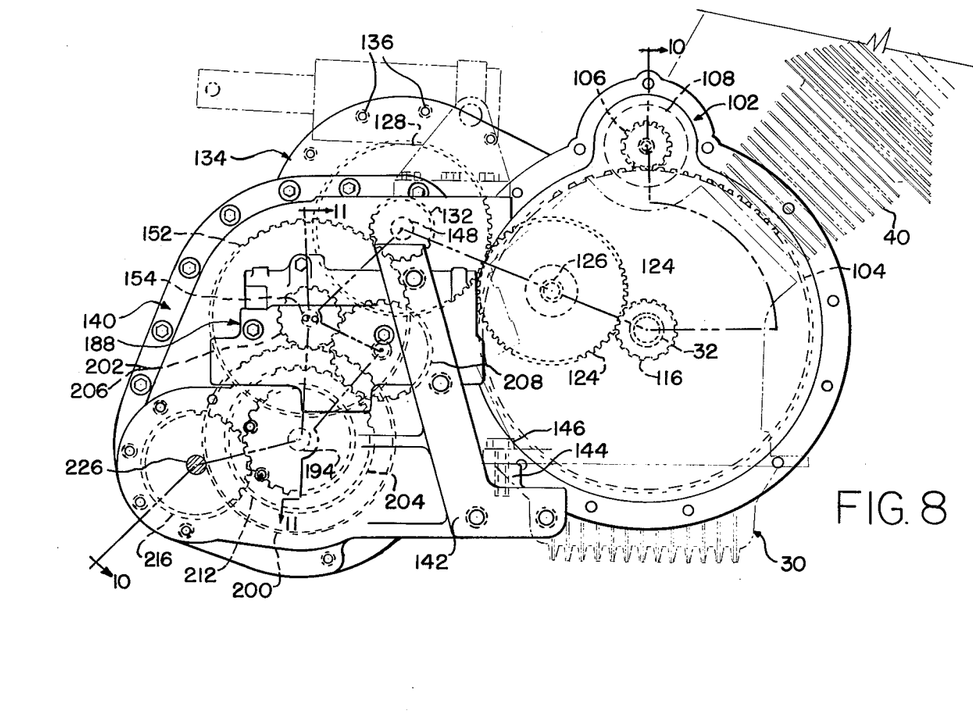
FIG. 8 is an enlarged side elevational view of the engine drive portion of the vehicle as shown in disassembled form in FIG. 4.
Figure 9:
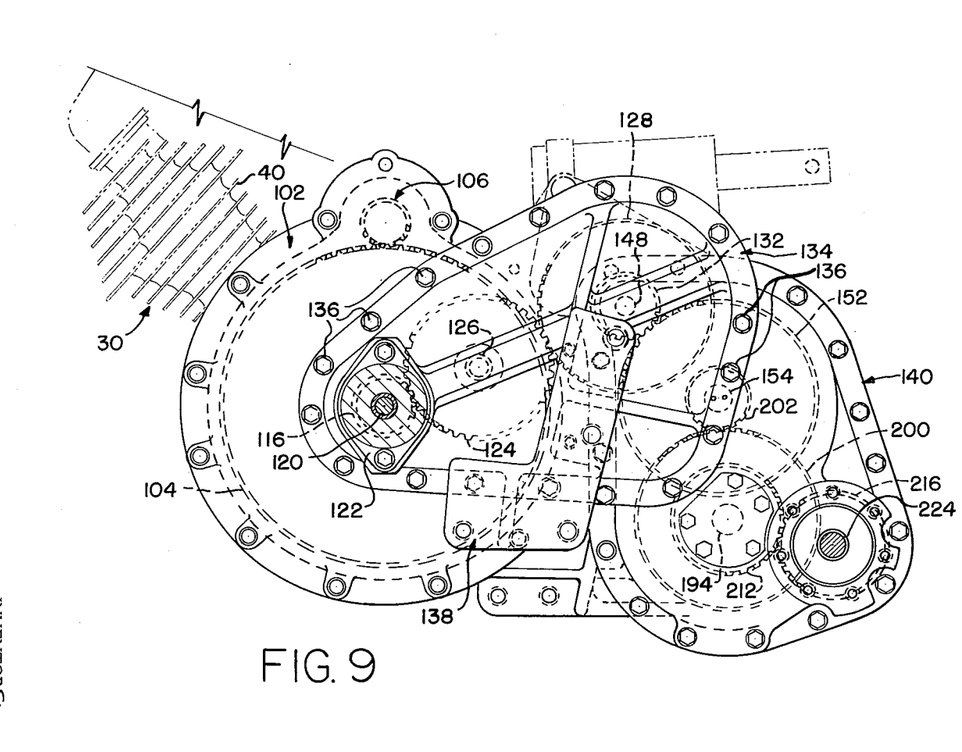
FIG. 9 is an enlarged side elevational view of the engine drive portion of the vehicle of FIG. 7, but showing the opposite side thereof.

Referring now more specifically to FIGS. 8, 9 and 10 of the drawings, the spindle 130 with the pinion 132 is carried on a shaft 148 having one end supported in the outer wall of housing 134 and the other end in a wall portion 150 of the housing 102. The pinion 132 is in constant mesh with a gear 152 which is splined on the main clutch and transmission shaft 154. The shaft 154 is journaled in bearings 156 and 158 carried in side walls 160 and 162, respectively, of the main housing 140.

The shaft 154 carries a cylindrical drum 164 having a central radial web 166 and a tubular center spindle 168 which is keyed to rotate with the shaft. A pair of chambers 170 and 172 are formed at each end of the drum 164 by the inner surface of the drum, the web 166 and the outer surface of the spindle 168. Within the chamber 170 there are provided a plurality of clutch disks 174 which are keyed to rotate with the drum 164 and are retained in the chamber by a retaining disk 176. Sandwiched between the disks 174 are a plurality of disks 178 which are keyed to rotate with a forward drive spindle 180 which is carried and freely rotatable on the shaft 154. Between the disks 174 and 178 and the web 166 within the chamber 170 there is provided a fluid actuated pressure member 182 which is axially slidable within the chamber. A spring 184 is provided to bias the member 182 toward the web 166 so that the disks 174 and 178 can rotate freely relative to each other. The shaft 154 is provided with a fluid passage 154a which communicates with the space between the member 182 and the web 166 so that hydraulic fluid under pressure may enter this space and force the member 182 outwardly from the web 166 to squeeze the disks 174 and 178 into interfacial contact with each other and thus cause the spindle 180 to rotate with the drum 164 and shaft 154. When the pressure within the space is relieved, the spring 184 forces the member 182 inwardly toward the web 166 and the disks 174 and 178 are no longer squeezed together and the spindle 180 can remain stationary as the drum rotates. A similar clutch-disk arrangement is provided in the chamber 172 at the other end of the drum in order to drive a reverse drive spindle 186 which is also carried by and freely rotatable on the shaft 154. Hydraulic fluid for energizing the clutch-disk assembly in chamber 172 is provided from the passage 154b in the shaft 154.

Thus, it will be seen from the foregoing description that the shaft 154 and drum 164 rotate continually, and when hydraulic fluid is supplied to the clutch-disk assembly in the chamber 170 through the passage 154a, this clutch assembly is engaged and the forward spindle 180 is driven with the shaft 154. When the pressure in passage 154a is relieved, the clutch assembly is disengaged and the spindle 180 no longer rotates with the shaft. If hydraulic fluid under pressure is supplied to the clutch-disk assembly in the chamber 172 through the passage 154b, this clutch assembly is thus engaged and the reverse drive spindle 186 rotates with the shaft 154 and if the pressure in the passage 154b is relieved, the clutch assembly disengages and the spindle 186 no longer rotates with the shaft.

Figure 2:
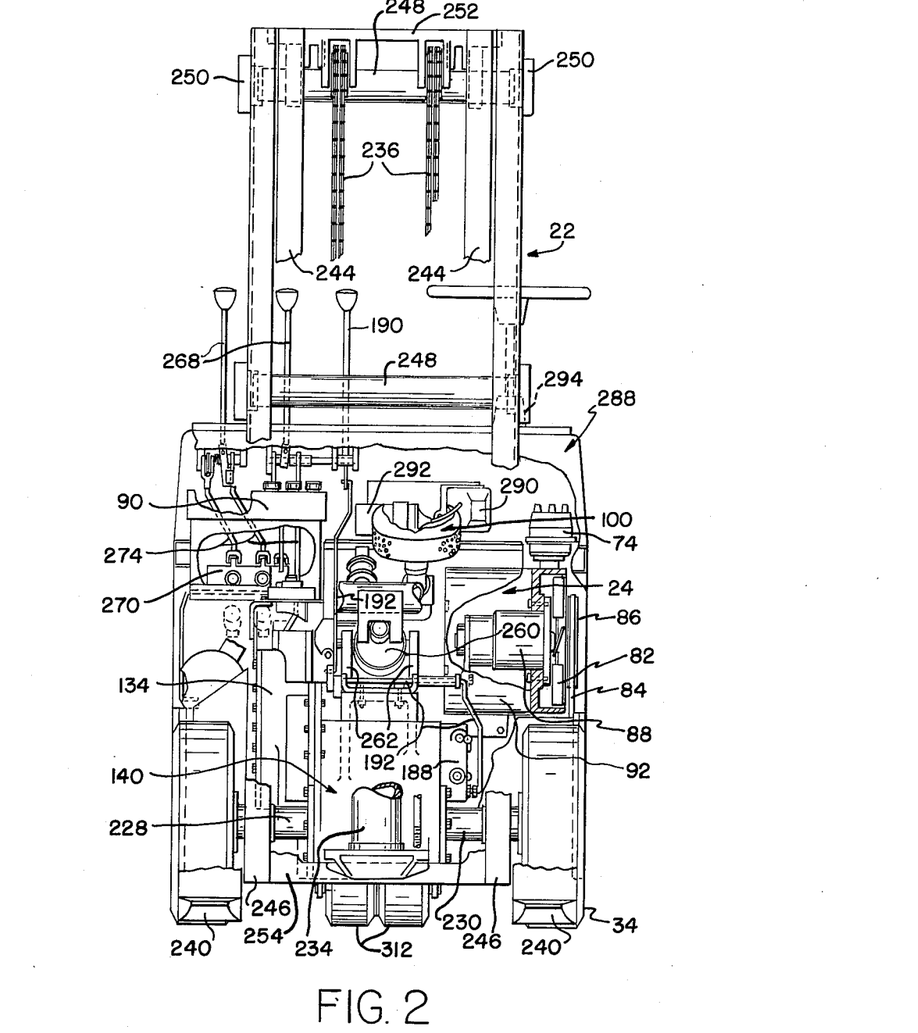
FIG. 2 is a front elevational view of the vehicle of FIG. 1 with portions broken away to show constructional details and sections.

In order to alternately supply hydraulic fluid to the passages 154a and 154b, there is provided a transmission control valve assembly 188. The valve 188 is positioned at the end of the shaft 154 which is provided with annular grooves communicating with passages 188a and 188b in the valve. The valve 188 is in communication with the hydraulic pump 122 and is controlled by a control lever 190 on the rear control section 26 through a mechanical linkage system 192 (FIG. 2).

In order to accomplish a further speed reduction and reverse gear drive, there is provided an auxiliary shaft 194 which is parallel to the shaft 154 and is journaled in bearings 196 and 198 carried in the side walls 160 and 162, respectively, of the housing 140. The shaft 194 is provided with a forward drive gear 200 which meshes with and is driven by a forward drive pinion 202 carried on the forward drive spindle 180. The gear 200 is splined on the shaft 194 so that when the spindle 180 is rotated the shaft 194 rotates in the opposite direction.

A reverse drive gear 204 is splined on the shaft 194 to rotate therewith when the reverse drive spindle 186 is rotated by engagement of the reverse clutch mechanism. The reverse drive spindle 186 is provided with a pinion 206 which drives a reverse idler gear 208 which is carried on an idler spindle 210 journaled in the side wall 162 (see FIG. 11).

The reverse idler 208 in turn drives the reverse gear 204 which rotates the shaft 194 in the same direction as the shaft 154 to provide a reverse drive for the vehicle. The final drive to the front drive wheels 34 is accomplished by a differential drive gear 212 which is also splined to rotate with the shaft 194 and which drives a differential cage 214 by means of the gear 216 secured thereon. The differential cage 214 is supported for rotation in the housing 140 by bearings 218 and 220 and includes a differential gear train 222 which differentially drives the wheels 34 through a pair of differential drive wheel axles 224 and 226. The drive wheel axles 224 and 226 extend outwardly from the housing 140 and are supported at their outer ends by suitable bearings (not shown) which are carried by axle housings 228 and 230, respectively, which are secured to the main housing 140 by bolts 232.

The forward lift portion 22 is a hydraulically operated fork lift mechanism of conventional construction having a hydraulic cylinder 234, operating chains 236, inner guide rollers 238, lifting forks 240 and their supporting cross bars 242 and roller support brackets 238a. The inner rollers 238 move up and down in intermediate sliding channel rails 244 which in turn slide in outer channel rails 246 which form the main frame of the structure. The rails 246 are connected to each other with a plurality of cross rods 248 carried by side brackets 250 secured to the outer edge of the rails. The rails 244 are connected together by a top cross-member 252 and rails 246 by a bottom cross-member 254 (FIG. 2) and the bottom ends of the rails 246 are pivotally secured to the front axle housings 228 and 230 by means of pivot brackets 256 and 258 so that the lift structure can pivot around the front axle of the vehicle.

Figure 1:
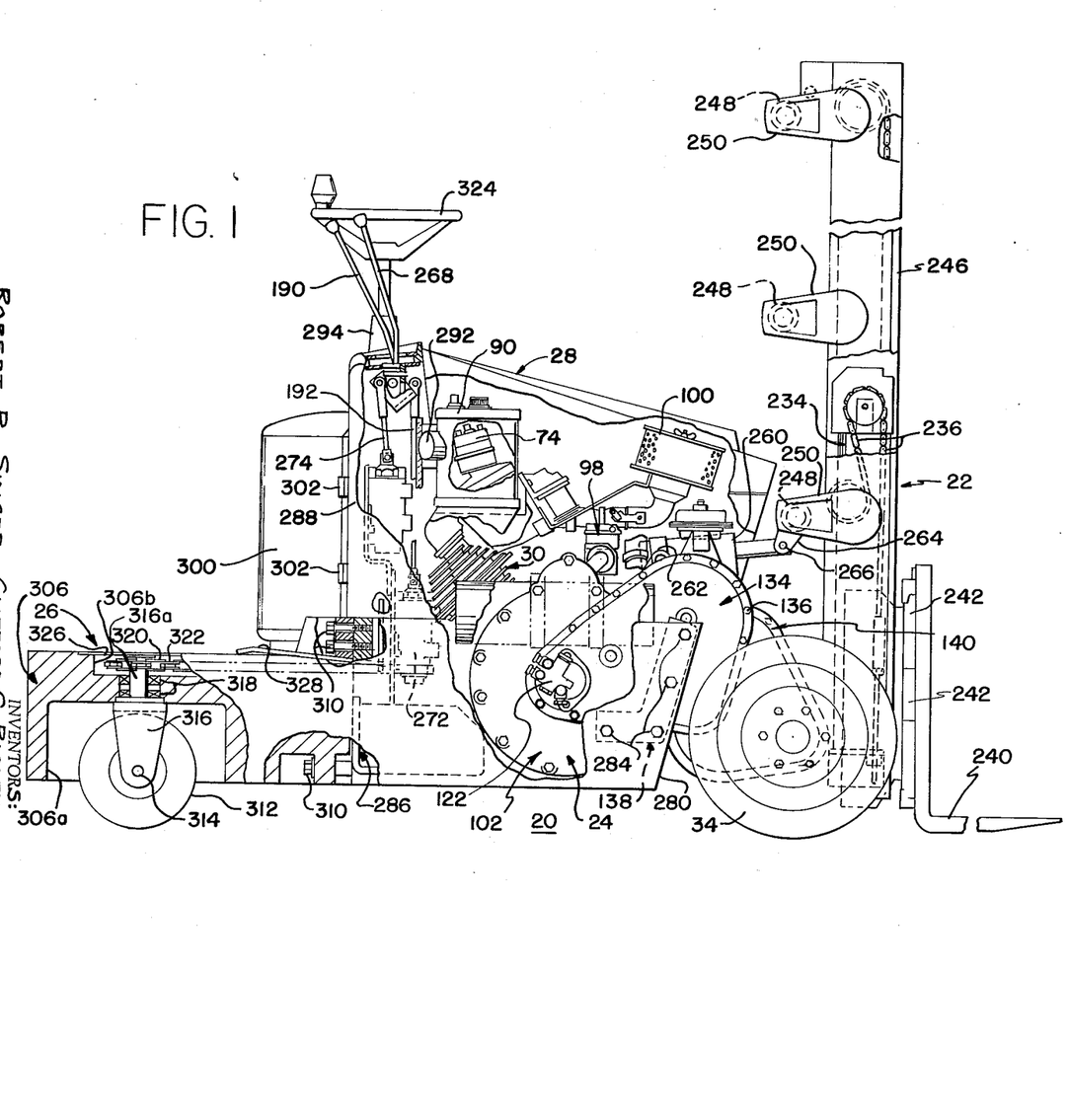
FIG. 1 is a side elevational view of a lift truck vehicle constructed in accordance with the present invention with portions broken away to show constructional details and sections.
Figure 4:
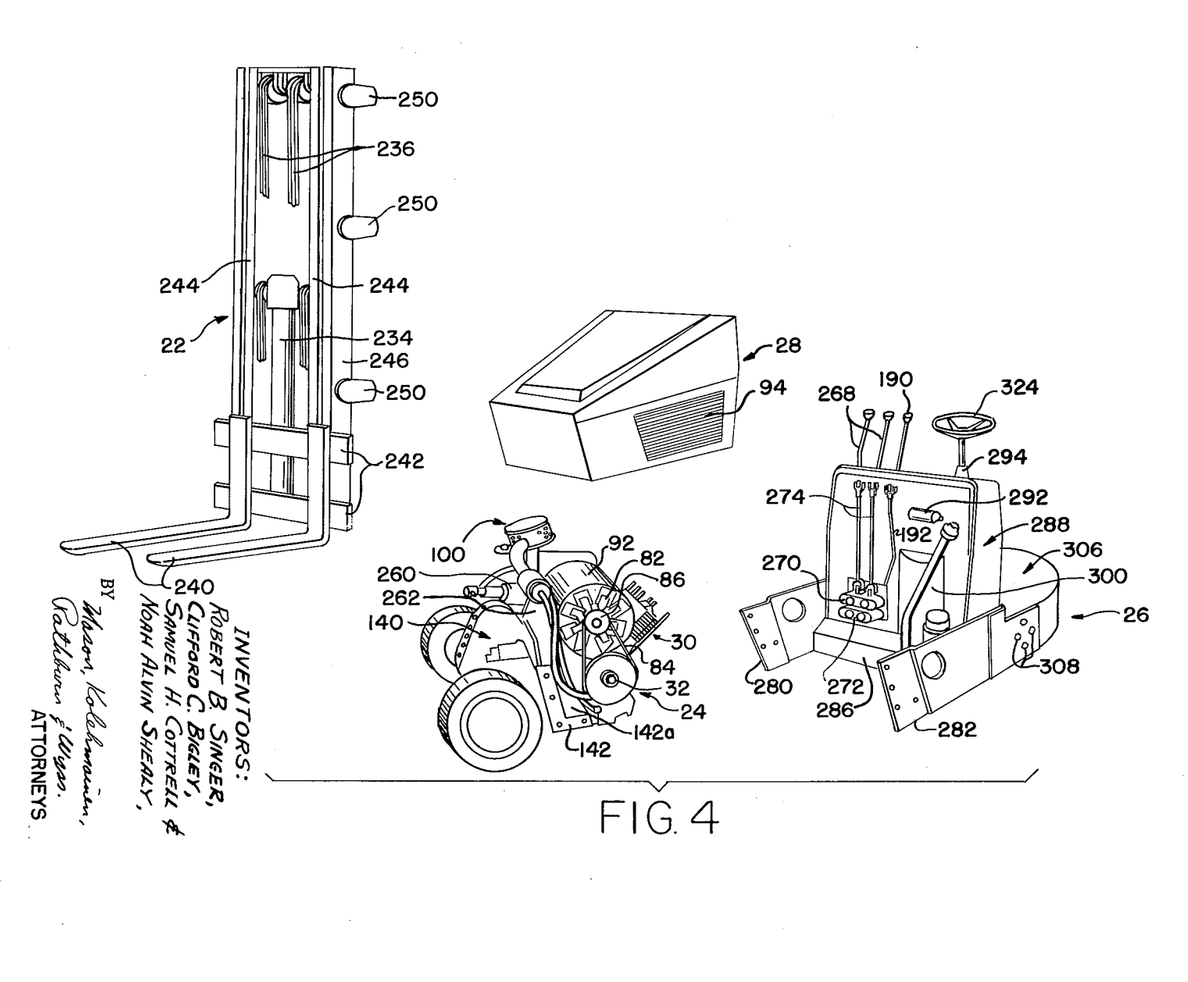
FIG. 4 is an exploded perspective view of the vehicle of FIG. 1 showing the major component portions of the vehicle as they are disassembled.

In order to control the tilt of the fork lift mechanism about the front axle, there is provided a single tilt control hydraulic cylinder 260 which is pivotally attached at one end to brackets 262 secured to or integrally formed on the housing 140. The rod end of the cylinder 260 is connected to the lowest cross-rod 248 of the fork lift by means of the pivot link 264 and pin 266 (FIG. 1). The cylinder 260 is a double acting type and is supplied with hydraulic fluid from the pump 122. The flow of hydraulic fluid to the lift cylinder 234 and the tile cylinder 260 is controlled by levers 268 which control hydraulic valves 270 and 272 (FIG. 1) through mechanical linkages 274. It can thus be seen from the foregoing description that the lifting action of the fork lift is controlled hydraulically by the cylinder 234 and the tilt of the fork lift is controlled by the single cylinder 260. The use of a single cylinder to control the tilt rather than the customary two cylinders results in less strain and twist on the lifting mechanism with consequently less side shifting of loads during a lift. Moreover, the use of a single cylinder provides for a stable 3 point support of the fork lift mechanism on the vehicle and additionally simplifies disassembly of the front lift portion 22 from the engine drive portion 24 as shown in FIG. 4. To complete this disassembly, it is only necessary to remove the pin 266 from the rod of the cylinder 260, disconnect the pivot brackets 256 and 258 from the rails 246 of the lift mechanism and finally disconect the hydraulic lines to the lift cylinder 234. Thus, the disassembly can be rapidly completed to facilitate service on the engine drive portion 24 or service or replacement of the front lift portion 22 of the vehicle.

The rear control portion 26 of the vehicle is comprised of a pair of side frames 280 and 282, respectively. The forward end of the frame 280 is provided with holes which line up with holes provided in the L-shaped boss 138 of the engine drive portion 24 when the side frame is positioned adjacent the boss as shown in FIG. 1. Likewise the side frame 282 is provided with holes which are aligned with holes in the boss 142 on the other side. A plurality of bolts 284 are utilized to secure the side frames to the L-shaped bosses and thus secure the rear control portion 26 to the engine drive portion 24.

Figure 3:
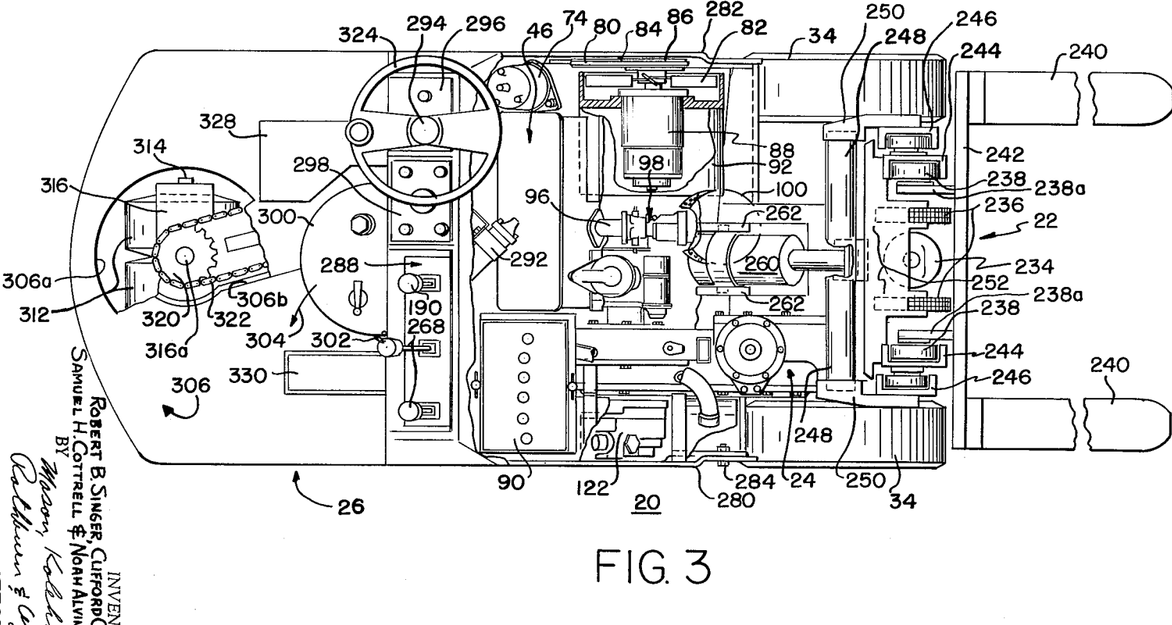
FIG. 3 is a top view of the vehicle of FIG. 1 with portions broken away to show constructional details and sections.

The side frames 280 and 282 are secured together at their rearward ends by a cross-member 286 and an upstanding control pedestal 288. The control pedestal is constructed of heavy sheet metal and is open on the forward side to house various components of the vehicle such as the valves 270 and 272 and their linkages 274, electrical components such as a voltage regulator 290 and spark coil 292 and numerous other components such as brake system linkages and a steering column 294. The top of the pedestal 288 forms a dash board for mounting controls 190 and 268 and instrument panels 296 and 298. The central portion of the rear wall of the pedestal 288 is removed in order to accommodate an upstanding cylindrical fuel tank 300 which is positioned to extend partially in front of and partially to the rear of the rear wall of the pedestal. The tank 300 is hinged to the wall at 302 so that it may swing outwardly in the direction of arrow 304 for ease in filling. The filling cap and fuel gage can be located on top of the tank for easy accessibility and view by the operator, and the tank, as shown in FIG. 3, is positioned to lay between the feet of the standing operator of the vehicle.

An operator's platform 306 is provided to accommodate the operator of the vehicle who operates the vehicle from a standing position. The platform 306 is constructed of a heavy casting and serves as a counterweight for the vehicle. The bottom is attached to the side frames 280 and 282 by bolts 308 (FIG. 4) and to the cross-member 286 by bolts 310 (FIG. 1).

The underside of the platform 306 is provided with an enlarged recess 306a (FIGS. 1 and 3) in order to accommodate the steerable rear wheels 312. The wheels 312 are supported on an axle 314 carried by a fork 316 which has a stem 316a pivotally journaled in suitable bearings 318 supported in the body of the platform. The upper end of the stem 316a is provided with a sprocket 320 on which a chain 322 is engaged. The chain 322 runs to another sprocket (not shown) located at the bottom of the steering column 294 to provide for steering of the vehicle by the steering wheel 324 on the upper end of the column. The sprocket 320 and chain 322 are housed in a recess 306b in the upper surface of the platform and a cover plate 326 is provided over the recess 306b so that the vehicle operator has a smooth surface to stand on.

Adjacent the forward end of the platform, there are provided foot pedals 328 and 330 for operating the brake system of the vehicle and the throttle of the vehicle engine, respectively. These pedals are pivotally supported from the cross-member 286 rather than the platform 306 so that the platform can easily be disassembled from the rest of the rear control portion 26 without disconnecting the brake or throttle system linkages.

Although the present invention has been described with reference to the illustrated embodiments, it should be understood that many other modifications and embodiments can be devised by those skilled in the art that will fall within the true spirit and scope of the principles of this invention.

What is claimed as new and desired to be secured by Letters Patent of the United States is:

1. An industrial vehicle for lifting and transporting loads comprising a forward power unit and a rearward control unit: said power unit comprising a prime mover having an output shaft extending transversely of said vehicle, clutch and transmission means secured to said prime mover and drivingly connected to said output shaft, differential and drive wheel means secured to and drivingly connected to said clutch and transmission means and a pair of oppositely and transversely outwardly extending support bosses for interconnecting said power unit with said control unit; said control unit including a rearwardly extending counterweight forming an operator's platform, an upstanding control pedestal at the forward end of said counterweight and a pair of parallel side frame members secured to said counterweight and control pedestal and extending forwardly of the latter, said side members formed with inner surfaces adjacent forward portions thereof disposed to extend on opposite sides of said power unit adjoining said support bosses and detachable means for securing the forward portions of said side members to said support bosses to join said units together into an integral structure.

2. An industrial vehicle for lifting and transporting loads comprising a forward power unit and a rearward control unit: said power unit comprising a prime mover having an output shaft extending transversely of said vehicle, clutch and transmission means including a housing secured to said prime mover and drivingly connected to said output shaft, differential and drive wheel means drivingly connected to said clutch and transmission means including a housing secured to the housing of said clutch and transmission means and a pair of oppositely and transversely outwardly extending support bosses formed on the housing of said clutch and transmission means for interconnecting said power unit with said control unit; said control unit including a rearwardly extending counterweight forming an operator's platform, an upstanding control pedestal at the forward end of said counterweight adjacent said prime mover and a pair of parallel side members secured to said counterweight and control pedestal and extending forwardly of the latter, said side members formed with inner surfaces adjacent forward end portions thereof extending on opposite sides of said power unit adjoining said support bosses and detachable means for securing the forward end portions of said side members to said support bosses joining said units together into an integral vehicle structure.

3. Apparatus as defined in claim 2 wherein said support bosses are substantially L-shaped and include upwardly extending portions and generally horizontally extending portions and said detachable means includes a plurality of fasteners joining both portions of each of said bosses to a respective side frame.

4. Apparatus as defined in claim 2 wherein said prime mover and the housings of said clutch and transmission means and said differential and drive wheel means are joined together forming an integral structure.

5. Apparatus as defined in claim 4 wherein said differential and drive wheel means includes a pair of transversely extending axle housings and further includes upstanding load lifting means pivotally mounted on said axle housings for tilting movement relative thereto and tilting means interconnecting the housing of said clutch and transmission means with said load lifting means.

6. Apparatus as defined in claim 5 including fluid cylinder means centrally disposed on said vehicle forming one end of said tilting means and piston means slidable in said cylinder means forming an opposite end of said tilting means and removable pin means pivotally connecting opposite ends of said tilting means to said load lifting means and the housing of said clutch and transmission means.

7. An industrial vehicle for lifting and transporting loads comprising a forward power unit and a rearward control unit: said power unit forming an integral structure combining a prime mover having an output shaft extending transversely of said vehicle, clutch and transmission means secured to said prime mover and drivingly connected to said output shaft, differential and drive wheel means secured to and drivingly connected with said clutch and transmission means and a pair of oppositely and transversely outwardly extending support bosses for interconnecting said power section with said control unit; said control unit including a rearwardly extending counterweight forming an operator's platform, an upstanding control pedestal at the forward end of said counterweight and a pair of parallel side members secured to said counterweight and control pedestal and extending forwardly of the latter, said side members formed with inner surfaces adjacent forward end portions thereof on opposite sides of said power unit adjoining said support bosses; detachable means for securing the forward ends of said side members to said support bosses to join said units together and fan means for cooling said power unit disposed to direct a flow of cooling air transversely of said vehicle.

8. Apparatus as defined in claim 7 including removable top cover means for enclosing a portion of said power unit, said cover means having a rearward end adjoining said control pedestal and side panels provided with air passage means for permitting a flow of cooling air into and out of said cover means.

9. An industrial vehicle for lifting and transporting loads comprising a forward power unit and a rearward control unit: said power unit comprising a prime mover having an output shaft extending transversely of said vehicle, clutch and transmission means including a casing secured to said prime mover and shaft means drivingly connected with and parallel to said output shaft, differential and drive wheel means including casing means secured to said casing and a reduction gear train having a shaft drivingly connected with and parallel to said shaft means and a pair of oppositely and transversely outwardly extending support bosses for interconnecting said power unit with said control unit; said control unit including a rearwardly extending counterweight forming an operator's platform, an upstanding control pedestal at the forward end of said counterweight adjacent said prime mover and a pair of parallel side members secured to said counterweight and control pedestal and extending forwardly of the latter, said side members formed with inner surfaces adjacent forward end portions thereof on opposite sides of said power unit adjoining said support bosses and detachable means for securing the forward ends of said side members to said support bosses to join said units of the vehicle together.

10. Apparatus as defined in claim 9 wherein said differential and drive wheel means includes a pair of transversely extending drive wheel axles, a centrally disposed differential mechanism drivingly connected to said axles and gear means for drivingly connecting said mechanism with the shaft of said reduction gear train.

References Cited by the Examiner
UNITED STATES PATENTS

| | | | |
|---|---|---|---|
| 1,707,428 | 4/1929 | Burrows | 180—70 |
| 2,154,249 | 4/1939 | Porter | 123—59 |
| 2,208,954 | 7/1940 | Weiss | 214—673 |
| 2,304,040 | 12/1942 | Ulinski | 180—54.3 |
| 2,362,129 | 11/1944 | Gfrorer | 214—674 |
| 2,471,429 | 5/1949 | Hawkins | 180—54.3 |
| 2,477,789 | 8/1949 | Dunham | 180—54.3 |
| 2,605,008 | 7/1952 | Schroeder | 214—672 |
| 2,712,857 | 7/1955 | Jackson | 180—70 |
| 2,733,825 | 2/1956 | Evans | 214—672 |
| 2,747,689 | 5/1956 | Abbe | 187—9 |
| 2,762,443 | 9/1956 | Dunham et al. | 180—11 |
| 2,774,498 | 12/1956 | Cordes et al. | 214—731 |
| 2,861,556 | 11/1958 | Bancel | 123—59 |
| 3,101,150 | 8/1963 | Jansen et al. | 296—28.8 |

HUGO O. SCHULZ, *Primary Examiner.*

MORRIS TEMIN, *Examiner.*